Patented Dec. 11, 1945

2,390,540

UNITED STATES PATENT OFFICE 2,390,540

RECOVERY OF COPPER FROM COPPER-BEARING SOLUTIONS

Cornelius H. Keller, San Francisco, Calif., assignor to The Dow Chemical Company, Midland, Mich., a corporation of Michigan No Drawing. Application October 5, 1944, Serial No. 557,383

8 Claims. (Cl. 23—147)

This invention relates to methods for recovering copper from solutions containing dissolved copper salts. It is particularly concerned with the recovery of copper values from solutions which are obtained in connection with certain metallurgical processes. Examples of such solutions are copper mine waters and solutions derived from leaching copper ores.

The acid leaching of oxidized copper ores has been extensively practiced. The usual leaching agent is a dilute sulphuric acid solution, which dissolves the oxidized copper minerals in the ore, yielding a dilute solution of copper sulphate. The commonly practiced methods of extracting the copper from such copper-bearing solutions have been by electrolytic deposition of metallic copper and by precipitation of copper with iron. Both methods are subject to certain disadvantages and limitations.

The electrolytic deposition recovers the copper directly in a highly pure form, but it does not strip the solutions completely of their copper content. According to usual practice the electrolytic cell liquors are handled in closed circuit with the acid copper-leaching solution, but owing to the accumulation of impurities a certain amount of the liquor must be discarded to hold the impurities below a fixed limit, and the copper from the discarded liquor must be recovered by other means. The electrolytic method is primarily adaptable to the treatment of strong acid solutions. Weakly acid or neutral solutions must be treated in other ways. The electrolytic method is economically practical only for large installations, where a sufficiently large volume of material is handled to justify the capital investment.

The precipitation of copper from its solutions by means of iron is the accepted method for treating weakly acid and neutral solutions, as well as discarded electrolytic cell liquors. The so-called cement copper produced is not pure, but depending upon conditions it may contain from as low as 40 to as much as 90 per cent metallic copper. It is obtained as a water-wet mass which is difficult to dry without excessive oxidation. The consumption of iron in the process is considerably more than the theoretical, being in general from 2 to 4 pounds of iron per pound of copper. The acid liquors dissolve iron, consuming an excess of iron and thereby consuming acid which might otherwise be returned to the leaching circuit. Inasmuch as these operations are conducted at mines or mills located usually at points remote from the source of supplies used for treating the materials, the cost thereof and losses normally incurred substantially increase the cost of the recovered copper.

For the foregoing and other reasons a method of recovering the copper present in mine and mill waters is desired, which is more economical in the consumption of chemical reagents and which is also adapted for use where the scale of operation is not large enough to justify a large capital investment for plant and equipment. It is an object of my invention to provide a process which, among others, will have the following advantages: (1) it can be applied equally well to acid or neutral copper solutions; (2) the reagents can be recovered for reuse in the process; (3) copper can be completely extracted from the solution; (4) copper may be recovered as a compound of commercial purity suitable for smelting or other purposes; (5) the equipment does not require a heavy capital investment and consists of such apparatus as is usually provided in mill installations.

The method of my invention is based upon the precipitation of copper from the leach solution as cuprous thiocyanate. The copper-bearing solution, which normally contains dissolved copper in the form of cupric compounds, is treated with a solution of a water-soluble thiocyanate and with a reducing agent to reduce cupric to cuprous compounds. The precipitation of cuprous thiocyanate is substantially quantitative from neutral or acid solutions, using the stoichiometric proportion of thiocyanate, and takes place almost instantaneously from cold or warm solutions. The precipitate, while fine at first, rapidly flocculates and settles, and can be separated from the solution by settling, centrifuging, filtration or flotation. The separated precipitate is then treated with an aqueous solution of a water-soluble alkaline agent capable of converting the cuprous thiocyanate to a soluble thiocyanate, leaving an insoluble copper compound as residue. The regenerated thiocyanate solution may be recycled in the process, while the insoluble copper residue is suitable for smelting according to usual practice.

In practicing the method any reducing agent can be used which is capable of reducing cupric to cuprous compounds in acid or neutral solutions. Examples are sulphur dioxide, sulphites, bisulphites, zinc, iron, or mixtures thereof. Suitable water-soluble thiocyanates for the precipitation of cuprous thiocyanate from the copper-bearing solutions are those of the alkali and alkaline earth metals and ammonia. The alkaline agents adapted for treating the cuprous thiocyanate precipitate are the hydroxides of the alkali and alkaline earth metals, alkali metal carbonates and alkali metal and ammonium sulphides.

The typical reaction for the precipitation of cuprous thiocyanate is the following, in which $CuSO_4$, $NaCNS$ and $SO_2$ are selected as examples of the respective compounds or reagents:

(1)
$$2CuSO_4 + 2NaCNS + SO_2 + H_2O \rightarrow 2CuCNS + 2H_2SO_4 + Na_2SO_4$$

The addition of the reducing agent, $SO_2$, may be made either before, during or after the addition of the thiocyanate. The reaction is substantially quantitative at normal temperature. The stoichiometrical proportion of the alkali thiocyanate suffices for the complete precipitation of the dissolved copper as cuprous thiocyanate. The presence of iron salts or other usual impurities in the copper-bearing solution does not affect the precipitation of cuprous thiocyanate or cause loss of the thiocynanate reagent.

The regeneration of the thiocyanate solution by treatment with the alkaline agent proceeds according to the following representative equations:

(2a)
$$2CuCNS + 2NaOH \rightarrow Cu_2O + 2NaCNS + H_2O, \text{ or}$$
(2b) $\quad CuCNS + NaOH \rightarrow CuOH + NaCNS$
(3) $\quad 2CuCNS + Na_2CO_3 \rightarrow Cu_2CO_3 + 2NaCNS$
(4) $\quad 2CuCNS + (NH_4)_2S \rightarrow Cu_2S + 2NH_4CNS$ Reactions 2a and 2b apparently take place together when cuprous thiocyanate is treated with an alkali hydroxide, yielding a mixed product of $Cu_2O$ and $CuOH$, which on heating is converted to the oxide. In the following description this product is referred to as cuprous oxide, although it may contain when formed more or less of the hydroxide.

The reactions of Equations 2-4 are likewise substantially quantitative at normal temperature, permitting regeneration of practically the theoretical quantity of alkali thiocyanate required for precipitating the cuprous thiocyanate. Thus, except for mechanical losses, the thiocyanate reagent can to a high degree be continuously recycled in the process without being consumed. In practice the treatment of the precipitated cuprous thiocyanate with alkali metal hydroxide has been found to give the best results, and is generally preferred.

In carrying out the preferred embodiment of the invention, the copper-bearing solution is mixed with an aqueous solution of an alkali thiocyanate, such as sodium, potassium, ammonium or calcium thiocyanate, preferably in proportion stoichiometrically equivalent to the copper content of the treated solution. Sulphur dioxide is passed into the solution until all cupric salts present are reduced to the cuprous state. The precipitate of cuprous thiocyanate is separated from the leaching solution by settling, centrifuging, filtration or flotation, and the separated precipitate may be washed, if desired, to free it from adhering acid solution. The precipitate is then repulped with an aqueous alkali hydroxide solution to convert the insoluble cuprous thiocyanate to the soluble alkali thiocyanate in order to recover the residual cuprous oxide or hydroxide. The quantity of alkali used is substantially chemically equivalent to the cuprous thiocyanate. The solution of alkali thiocyanate is separated from the residual cuprous oxide, and the latter water-washed free of thiocyanate. The alkali thiocyanate solution and wash waters may be combined and re-used for further precipitation of copper from solutions. Similar procedure is followed when using alkali carbonate or sulphide for treating the cuprous thiocyanate, where, as the case may be, the residual copper compound obtained is the carbonate or sulphide.

In different modifications of the invention, the recovery of dissolved copper from its solutions may be combined with other metallurgical processing of the ore from which the solution is derived. Oxide copper minerals are often associated with sulphide copper minerals which are substantially insoluble in dilute acid. In treating such mixed ores, the sulphide copper minerals may be separated by flotation or other methods according to usual practice, and the tailings then leached with sulphuric acid to obtain a copper-bearing solution, from which the copper is recovered by precipitation as cuprous thiocyanate and converted to the oxide, carbonate or sulphide according to the present invention.

Another modification of the treatment of mixed copper ores consists in leaching such ores with acid to dissolve the oxidized copper, precipitating cuprous thiocyanate and then floating off the sulphide copper and cuprous thiocyanate together. The flotation concentrate may then be treated with caustic alkali solution to convert the cuprous thiocyanate to cuprous oxide and to recover the alkali thiocyanate. The final mixed concentrate of copper sulphide and cuprous oxide may then be smelted in usual manner.

According to a further modification, a mixed sulphide-oxide copper ore may be leached with sulphuric acid and treated as described in the preceding paragraph to obtain a mixed flotation concentrate of copper sulphide and cuprous thiocyanate. The concentrate may then be treated with ammonia to dissolve the cuprous thiocyanate. The ammoniacal copper solution is filtered from the insoluble sulphide residue which is smelted separately. The ammoniacal cuprous thiocyanate solution is then acidified to reprecipitate the cuprous thiocyanate, which is separated and treated with alkali to convert it to cuprous oxide and to regenerate a solution of alkali thiocyanate for re-use in the process.

Without limiting the scope of the invention, the following examples will serve to illustrate various ways of carrying out the principle of the process.

*Example 1*

1000 grams of an ore assaying 0.72 per cent sulphide copper and 0.40 per cent acid-soluble copper was ground in a ball mill. The pulp was transferred to a flotation cell, diluted to a volume of 4 liters, conditioned with potassium ethyl xanthate and pine oil, and the sulphide mineral was floated off in the usual manner. The tailings pulp was acidified with $H_2SO_4$ to an acid concentration of about 0.25 per cent, and agitated in the same cell for 1 hour. The pulp was allowed to settle and the clear liquid was decanted. The pulp was then made up to volume with water, acidified and agitated for 15 minutes. This first wash was decanted from the pulp, which was then washed again with weak acid in the same manner. This procedure was repeated a third time. The pregnant solution and the three wash solutions were each separately treated to recover their respective copper contents. Each solution was reduced with $SO_2$ by bubbling the gas through until the dissolved copper was converted to the cuprous state. The copper was precipitated in each case by adding the theoretical amount of an aqueous KCNS solution, and the several precipitates were filtered, dried, weighed and assayed. The percentage recoveries were as follows:

|  | Total Cu | Acid-sol. Cu |
|---|---|---|
|  | Per cent | Per cent |
| Sulphide float | 56.2 |  |
| Pregnant solution | 20.7 | 54.2 |
| 1st wash | 8.8 | 23.0 |
| 2nd wash | 3.6 | 9.5 |
| 3rd wash | 1.5 | 4.0 |
| Total recovery | 90.8 | 90.7 |
| Tails | 9.2 | 9.3 |

The precipitation of copper from the pregnant and wash solutions as CuCNS was substantially quantitative.

Example 2

500 grams of the same ore as in Example 1 was ground in a ball mill, the pulp transferred to a flotation cell and made up to a volume of 2½ liters with water. The solution was acidified by adding 5 cc. $H_2SO_4$ and agitated in the cell for 90 minutes, while slowly bubbling $SO_2$ gas into the pulp. The dissolved copper was then precipitated in situ with the calculated amount of KCNS. Suitable chemical flotation reagents and a frother were added and the sulphide mineral and the precipitated CuCNS were floated together. The flotation concentrate was then treated with a NaOH solution to convert CuCNS to NaCNS and the residue was separated by filtration and washed with water to recover the NaCNS. The copper concentrate containing a mixture of copper sulphide and cuprous oxide was dried, weighed and assayed. The copper recovery from the original ore was as follows:

|  | Per cent |
|---|---|
| Sulphide copper | 96.0 |
| Acid-soluble copper | 85.2 |
| Overall copper | 92.6 |

The NaCNS solution obtained by filtration of the concentrate, combined with the wash waters, contained 97.9 per cent of the thiocyanate employed.

Example 3

A sample of the same copper ore as in Example 1 was treated by flotation in the usual manner for recovery of sulphide copper, and the tailings were then leached with dilute $H_2SO_4$ to extract acid-soluble copper. The copper-bearing solution was decanted from the leached residue and the latter washed three times with dilute acid as in Example 1. The original leach solution and subsequent washes were combined and divided into two equal parts. In each part the dissolved copper was precipitated by treatment with $SO_2$ and the calculated amount of KCNS. The precipitated CuCNS was separated from one solution by filtration and from the other by flotation using potassium ethyl xanthate and pine oil as reagents. The filtered precipitate after drying assayed 50.44 per cent copper (CuCNS=52.26 per cent copper), and the floated precipitate assayed 49.70 per cent copper. The recovery of copper as CuCNS from each solution was quantitative.

Example 4

Another charge of the same ore was treated by flotation to recover the sulphide copper and the flotation tailings were leached with 0.25 per cent $H_2SO_4$ solution, as before. The pulp was then treated by bubbling $SO_2$ gas through until the dissolved copper was reduced to the cuprous state. The calculated amount of KCNS was then added to the pulp to precipitate CuCNS. Potassium ethyl xanthate and pine oil were added and the CuCNS was separated by flotation. The first concentrate was cleaned by refloating. The cleaned concentrate after drying assayed 27.2 per cent copper and accounted for 87.9 per cent of the acid-soluble copper in the ore. The overall extraction of the copper in the ore was 90.3 per cent.

Example 5

A sample of the same ore was ground and agitated with approximately 0.30 per cent $H_2SO_4$ for 90 minutes. The calculated amounts of $NaHSO_3$ and NaCNS for reduction and precipitation of the dissolved copper were added to the pulp, which was agitated for 5 minutes more. The pulp was then conditioned for flotation by the addition of Minerec "A" in the amount of 0.1 pound per ton of ore and pine oil 0.12 pound per ton, and subjected to flotation in two stages with further additions of pine oil of 0.08 and 0.1 pound per ton in the respective stages. The flotation concentrate was treated with aqua ammonia to dissolve the CuCNS and the resultant solution was filtered from the sulphide residue. The solution was acidified with $H_2SO_4$ to reprecipitate CuCNS, which was filtered off and dried. The dry precipitate was decomposed with 5 per cent NaOH solution and the resulting copper oxides were separated from the solution of NaCNS. The percentage distribution of copper in the sulphide concentrate, cuprous oxide and tailings respectively was as follows:

|  | Total Cu | Acid-sol. Cu. |
|---|---|---|
|  | Per cent | Per cent |
| Sulphide | 65.05 | 20.56 |
| Oxide | 19.72 | 45.97 |
| Tailings | 15.23 | 33.47 |
|  | 100.00 | 100.00 |

The NaCNS recovered in the solution separated from the copper oxides was 98 per cent of the NaCNS required to precipitate the acid-soluble copper.

Example 6

A 500 cc. portion of a copper-bearing acid solution containing 0.74 gm. copper per liter was reduced with $SO_2$, and the copper precipitated by adding 0.45 gm. $NH_4CNS$ (theoretical requirement=0.443 gm. $NH_4CNS$). The precipitated CuCNS was filtered, washed and decomposed with 5 per cent NaOH solution. The resulting copper oxides were washed, dried and assayed. The recovery of copper was 98.9 per cent, and the solution resulting from the treatment of CuCNS with NaOH contained NaCNS equivalent to 98.7 per cent of the $NH_4CNS$ required to precipitate the copper.

Example 7

Another 500 cc. portion of the copper-bearing solution used in Example 6 was reduced by adding zinc powder in the presence of the calculated amount of NaCNS. The precipitated CuCNS was treated as described in Example 6. The recovery of copper was 99.2 per cent, and of NaCNS 98.5 per cent.

Example 8

A 500 cc. portion of the same solution was reduced with iron powder and $NaHSO_3$ in the presence of NaCNS, and the precipitated CuCNS converted to copper oxides as before. The recovery of copper was 99.6 per cent, and of NaCNS was 99 per cent.

Example 9

Another 500 cc. portion of the copper-bearing solution was reduced with $SO_2$ in the presence of the calculated amount of $Ca(CNS)_2$. The precipitated CuCNS was decomposed with an excess of $Ca(OH)_2$ in water. The residue consisted of 82.8 per cent copper oxide, the balance being lime. The recovery of copper was 99.9 per cent, and of $Ca(CNS)_2$ was 100 per cent.

Example 10

Cuprous thiocyanate, precipitated from a copper leach solution, was treated with the theoretical amount of an aqueous ammonium sulphide solution, to convert the cuprous thiocyanate to cuprous sulphide. The cuprous sulphide was recovered in amount corresponding to 98 per cent of the cuprous thiocyanate taken, while the recovery of ammonium thiocyanate was 99.2 per cent of theory. When using sodium sulphide in similar manner, the recovery of cuprous sulphide was 95.6 per cent, and of sodium thiocyanate was 97 per cent, of theory.

The present method may be applied generally for the recovery of copper from copper-bearing solutions of neutral or acid character. This includes solutions obtained by acid-leaching copper ores, copper mine water and spent electrolyte from electrolytic copper recovery operations.

Another application of the invention is for the purification of zinc salt solutions in the electrolytic zinc process. Such solutions are obtained in practice by leaching the zinc-bearing ore with sulphuric acid and neutralizing the acid leach solution with an alkali, such as lime. The neutralized leach solution usually contains small amounts of impurities derived from the ore, of which copper is one of the most common. It is necessary to remove the impurities before the solution is electrolyzed to recover its zinc content. The usual method of removing the copper impurity is by means of metallic zinc which precipitates the copper in metallic form. Such precipitated copper is not pure, being contaminated with excess zinc used in the treatment and with other metals, such as cadmium. By means of the method of this invention, however, copper can be quantitatively removed from such electrolytic zinc solutions and recovered directly as cuprous oxide of commercial purity. The following example illustrates the purification of an electrolytic zinc solution according to the invention.

Example 11

A 500 cc. portion of an electrolytic zinc solution, assaying 120 gms. Zn and 0.612 gm. Cu per liter, was reduced by adding 0.5 gm. $NaHSO_3$ in aqueous solution. Copper was then precipitated as CuCNS by addition of 0.5 gm. NaCNS. The precipitated CuCNS was allowed to settle, and then separated from the solution by flotation. The extraction of copper as CuCNS was 98 per cent. The presence of cadmium in the solution does not interfere with the precipitation of cuprous thiocyanate.

I claim:

1. The method of recovering copper from copper-bearing solutions which comprises adding a water-soluble thiocyanate to the solution in the presence of a reducing agent, separating the precipitated cuprous thiocyanate, treating the latter with an aqueous alkaline agent selected from the class consisting of the alkali and alkaline earth metal hydroxides, alkali metal carbonates and alkali metal and ammonium sulphides to convert the cuprous thiocyanate to the corresponding water-soluble alkali thiocyanate and leave an insoluble copper compound as residue, and separating the residue from the aqueous thiocyanate solution.

2. The method of recovering copper from copper-bearing solutions which comprises adding a reducing agent to the solution to reduce cupric compounds to cuprous compounds, treating the reduced solution with a water-soluble thiocyanate to precipitate cuprous thiocyanate, separating the precipitate, treating the latter with an aqueous alkali to convert it to cuprous oxide and a solution of a water-soluble thiocyanate and separating the cuprous oxide from the solution.

3. Method according to claim 2, in which the reducing agent is sulphur dioxide.

4. Method according to claim 2, in which the aqueous alkali is an alkali metal hydroxide solution.

5. The method of extracting copper from a copper ore containing acid-soluble copper values which comprises leaching the ore with acid, treating the copper-bearing leach solution with a reducing agent to reduce cupric compounds to cuprous compounds, adding a water-soluble thiocyanate to precipitate cuprous thiocyanate from the solution, separating the precipitate, treating the latter with an aqueous alkali to convert cuprous thiocyanate to cuprous oxide and a solution of a water-soluble thiocyanate for reuse and separating the insoluble residue containing cuprous oxide from the aqueous solution.

6. Method according to claim 5 wherein a copper ore containing both sulphide copper and acid-soluble copper is treated by flotation to recover the sulphide copper, the tailings are leached with acid and the acid leach solution is treated in the manner described to recover its copper values and the water-soluble thiocyanate for reuse.

7. Method according to claim 5 wherein a copper ore containing both sulphide copper and acid-soluble copper is leached with acid, the pulp is treated directly with a reducing agent and a water-soluble thiocyanate, the sulphide copper and cuprous thiocyanate are recovered by flotation and the flotation concentrate is treated with aqueous alkali to recover a solution of water-soluble thiocyanate for reuse which is separated from the mineral residue containing cuprous oxide.

8. Method according to claim 5, wherein the copper ore containing both sulphide copper and acid-soluble copper is leached with acid, the pulp is treated directly with a reducing agent and a water-soluble thiocyanate, the sulphide copper and cuprous thiocyanate are recovered by flotation, the flotation concentrate is extracted with aqueous ammonia to dissolve out cuprous thiocyanate, the resulting ammoniacal copper solution is acidified to reprecipitate cuprous thiocyanate and the latter separated and treated with aqueous alkali to recover a solution of water-soluble thiocyanate for reuse which is separated from the cuprous oxide residue.

CORNELIUS H. KELLER.